US011091240B1

(12) United States Patent
Morozov et al.

(10) Patent No.: US 11,091,240 B1
(45) Date of Patent: Aug. 17, 2021

(54) SOUND SOURCE FOR AUTONOMOUS UNDERWATER VEHICLE

(71) Applicant: TELEDYNE INSTRUMENTS, INC., Thousand Oaks, CA (US)

(72) Inventors: Andrey K. Morozov, North Falmouth, MA (US); Clayton P. Jones, Falmouth, MA (US)

(73) Assignee: TELEDYNE INSTRUMENTS, INC., Thousand Oaks, CA (US)

( * ) Notice: Subject to any disclaimer, the term of this patent is extended or adjusted under 35 U.S.C. 154(b) by 0 days.

(21) Appl. No.: 17/106,464

(22) Filed: Nov. 30, 2020

Related U.S. Application Data

(62) Division of application No. 16/848,939, filed on Apr. 15, 2020, now Pat. No. 10,882,592.

(51) Int. Cl.

| | |
|---|---|
| ***B63G 8/00*** | (2006.01) |
| ***G01K 9/00*** | (2006.01) |
| ***G10K 9/122*** | (2006.01) |
| ***B06B 1/06*** | (2006.01) |

(52) U.S. Cl.
CPC ............ *B63G 8/001* (2013.01); *B06B 1/0618* (2013.01); *G10K 9/122* (2013.01); *B63G 2008/002* (2013.01)

(58) Field of Classification Search
CPC ......................... B63G 8/001; B63G 2008/002; B06B 1/0618; G10K 9/122
See application file for complete search history.

(56) References Cited

U.S. PATENT DOCUMENTS

| | | | | | |
|---|---|---|---|---|---|
| 3,718,207 | A * | 2/1973 | Babb | G01V 1/147 | 181/120 |
| 3,827,023 | A * | 7/1974 | Henriquez | B06B 1/0655 | 367/159 |
| 4,030,063 | A * | 6/1977 | Wallen | G10K 9/10 | 367/143 |
| 5,487,350 | A * | 1/1996 | Chace, Jr. | B63G 8/001 | 114/330 |
| 5,537,947 | A * | 7/1996 | Couture | B63B 22/003 | 114/20.1 |
| 5,600,087 | A * | 2/1997 | Chace, Jr. | F41J 9/04 | 114/20.1 |
| 6,069,845 | A * | 5/2000 | Ambs | B06B 1/0633 | 367/165 |

(Continued)

OTHER PUBLICATIONS

Morozov, "Tunable and Broadband resonator pipe sound sources for ocean acoustic tomography, communications and long-range navigation", Oceans 2017—Aberdeen, Aberdeen, 2017, pp. 1-8.

*Primary Examiner* — Ian J Lobo
(74) *Attorney, Agent, or Firm* — K&L Gates LLP

(57) ABSTRACT

An underwater sound source includes a cylindrical body having a front body portion, a rear body portion, a cylindrical piezo-ceramic ring transducer disposed therebetween, a flexible sleeve configured to cover an outer surface of the cylindrical piezo ceramic ring transducer, and a resonant pipe mounted to the cylindrical body and surrounding the cylindrical piezo-ceramic ring transducer. The resonant pipe is disposed around the cylindrical piezo-ceramic ring transducer, forming a gap between an inner surface of the resonant pipe and the outer surface of the cylindrical piezo-ceramic ring transducer.

13 Claims, 9 Drawing Sheets

(56) References Cited

U.S. PATENT DOCUMENTS

| | | | | |
|---|---|---|---|---|
| 6,464,035 | B1 * | 10/2002 | Chelminski ............ | G01V 1/135<br>181/114 |
| 6,545,949 | B1 * | 4/2003 | Franklin ................ | H04R 17/00<br>310/337 |
| 8,670,293 | B2 * | 3/2014 | Morozov ............... | H04B 11/00<br>367/176 |
| 10,882,592 | B1 | 1/2021 | Morozov et al. | |
| 2018/0222560 | A1 * | 8/2018 | Postic .................... | B63G 8/001 |
| 2019/0057680 | A1 * | 2/2019 | Morozov ............... | G01V 1/133 |

* cited by examiner

SOUND SOURCE FOR AUTONOMOUS UNDERWATER VEHICLE

STATEMENT OF PRIORITY

This application is a divisional application filed under 35. U.S.C. § 121 of U.S. patent application Ser. No. 16/848,939 entitled "MOBILE LOW FREQUENCY SOUND SOURCE FOR UNDERWATER COMMUNICATION AND NAVIGATION" filed on Apr. 15, 2020, the disclosure of which is incorporated herein by reference in its entirety and for all purposes.

BACKGROUND

There is a growing demand for autonomous underwater vehicles (AUV), that can communicate with each other along with land centers through long distance underwater acoustic communication networks. The signal travel time between nodes in underwater networks can be also used for navigation. The modern AUV, and specifically underwater gliders, can cover a large ocean area and gather ocean data through underwater acoustic networks. Such networks of AUVs may decrease information recovery delays and increase the efficiency of the ocean operational monitoring in real time. Such system can improve the potential coverage and informational rate of gathered sensor data in the ocean observation networks. Underwater acoustic communication networks for AUV were recently in a greater focus of a variety of interested oceanology institutions and organizations. In one application, such networks of AUVs may be deployed in polar areas, where partial or complete ice cover restricts or makes hazardous the data access from the sea surface. Although the data rate of long range acoustic communications is much less than that obtained using satellite communications, and the precision of acoustical navigation is less than GPS, nevertheless, underwater acoustic systems may be the only way to provide geo-location and telemetry in ice-covered regions. A compact, light, efficient, depth independent mid- and low-frequency sound source included in the structure of the AUV or glider may be well suited for long range underwater communication.

To transmit signals underwater to a distance of about 300 kilometers, an AUV may need a small, efficient, transducer transmitting and receiving at a frequency range of about 500 Hz to about 1500 Hz. In this frequency range, the present technology generally relies on rather large piezo-ceramic rings, spheres, and tonpilz transducers, or heavy flextensional and flexural transducers equipped with a pressure gas compensation system. The heavy piezo-ceramic transducers in this frequency range cannot be used on a small AUV, and pressure-compensated systems are not reliable and depth limited.

Present examples of such acoustic sources for use with an AUV have been disclosed in U.S. Pat. No. 5,537,947 (to Couture et al.), U.S. Pat. No. 5,487,350 (to Chance et al), and U.S. Pat. No. 5,600,087 (to Chance). These example include the use of a piezo-ceramic ring specifically tuned out of resonance thereby having very low efficiency and only a short term expendable application. Such a solution is not practical for a long term underwater AUV network.

Some examples of underwater sound sources operating in the frequency range of about 500 Hz to about 1500 Hz may include:

1. Piezo-ceramic rings, spheres and tonpilzs. However, the dimensions of piezo-ceramic transducers working in this frequency band are too large, and transducers are too heavy for a small AUV.
2. Heavy flextensional and flexural transducers equipped with the pressure gas compensation system. However, the pressure-compensated systems are not reliable and depth limited. Additionally, the transducers may be too bulky or heavy for use with a small AUV.

Alternatives to the transducers disclosed above for long term underwater use may include the use of free flooded resonators. They can be reasonably small and the resonator can use a light carbon fiber composite material. These transducers are very efficient and can support long range communication for a long time. Unfortunately, free flooded resonators are sensitive to the closed environment (about 1 m for 1500 Hz) and can be used only as a part of the AUV design. These transducers are not very broadband, but they are very efficient, which is important for autonomous battery powered systems. The problem with all the above-mentioned transducers, and specifically for free flooded resonators, is their sensitivity to the surrounding enclosure. Working on a small vehicle, the source has to be designed as part of a whole system. The vehicle with sound source should have a streamlined form thereby not increasing its drag coefficient.

SUMMARY

In one aspect, an underwater sound source may include a cylindrical body composed of a front body portion and a rear body portion, a cylindrical piezo-ceramic ring transducer disposed between the front body portion and the rear body portion, a flexible sleeve configured to cover an outer surface of the cylindrical piezo-ceramic ring transducer, and a resonant pipe mounted to the cylindrical body and surrounding the cylindrical piezo-ceramic ring transducer. The resonant pipe, disposed around the cylindrical piezo-ceramic ring transducer, may form a gap between an inner surface of the resonant pipe and the outer surface of the cylindrical piezo-ceramic ring transducer.

In another aspect, an underwater sound source may include a cylindrical body, a front fairing disposed forward of a front end of the cylindrical body, a plurality of metal rods, in which each of the plurality of metal rods is attached at a first end to a front portion of the cylindrical body and attached at a second end to a rear portion of the front fairing, a spherical piezo-ceramic transducer disposed between the cylindrical body and the front fairing and mounted on the plurality of metal rods, and a resonant pipe mounted to the front end of the cylindrical body. The spherical piezo-ceramic transducer may be at least partially disposed within a cavity formed by an interior volume of the resonant pipe. Further, a front end of the resonant pipe may be separated from the rear portion of the front fairing by a cylindrical orifice.

FIGURES

Various features of the aspects described herein are set forth with particularity in the appended claims. The various aspects, however, both as to organization and methods of operation, together with advantages thereof, may be understood in accordance with the following description taken in conjunction with the accompanying drawings as follows:

DESCRIPTION

Figure 1:
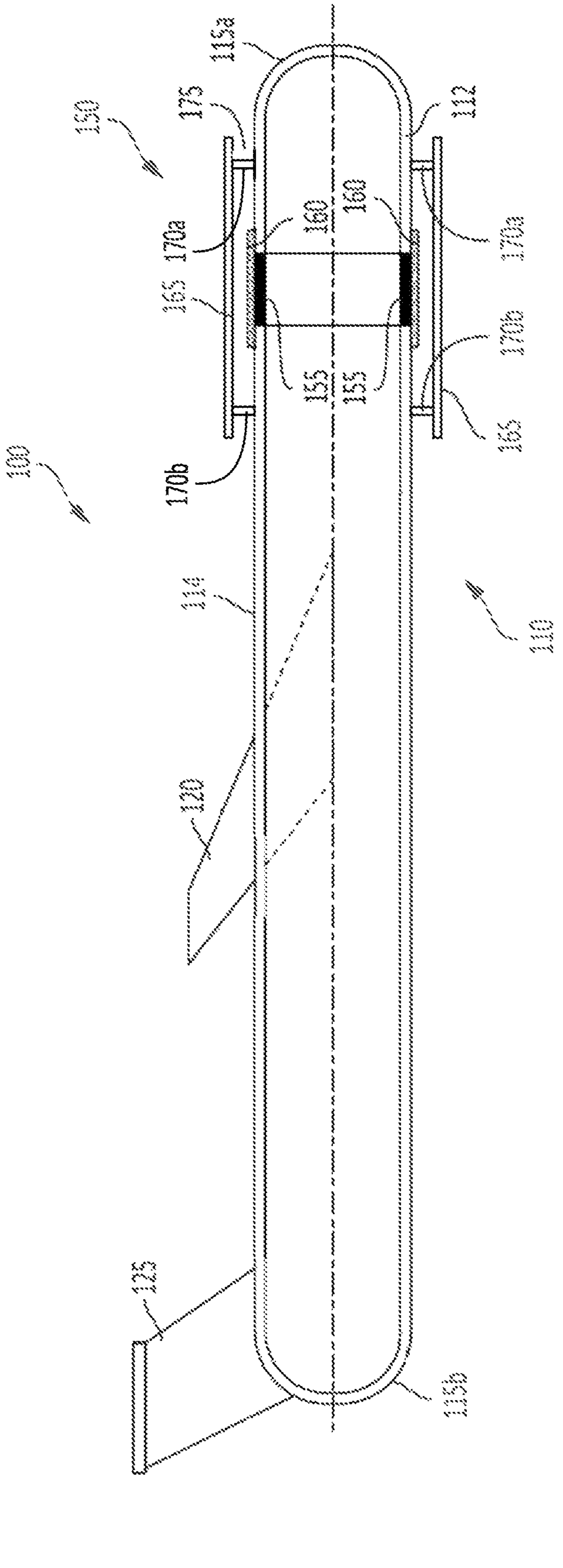
FIG. 1 depicts a diagram of a first aspect of an autonomous underwater vehicle, according to an aspect of the present disclosure.

As disclosed above, there is a growing demand for autonomous underwater vehicles (AUV), that can communicate with each other along with land centers through long distance underwater acoustic communication networks. The signal travel time between nodes in underwater networks can be also used for navigation. The modern AUV, and specifically underwater gliders, can cover a large ocean area and gather ocean data through underwater acoustic networks. Such networks of AUVs may decrease information recovery delays and increase the efficiency of the ocean operational monitoring in real time. Such system can improve the potential coverage and informational rate of gathered sensor data in the ocean observation networks. Underwater acoustic communication networks for AUV were recently in a greater focus of a variety of interested stakeholders. In one application, such networks of AUVs may be deployed in polar areas, where partial or complete ice cover restricts or makes hazardous the data access from the sea surface. Although the data rate of long range acoustic communications is much less than that obtained using satellite communications, and the precision of acoustical navigation is less than GPS, nevertheless, underwater acoustic systems may be the only way to provide geo-location and telemetry in ice-covered regions. A compact, light, efficient, depth independent mid- and low-frequency sound source included in the structure of the AUV or glider may be well suited for long range underwater communication.

Disclosed herein is a component of a long range communications system for an autonomous underwater vehicle (AUV) acoustic network. In order to transmit signals underwater to a distance of about 300 kilometers, an AUV needs a small, efficient, transducer that may operate in a frequency range of about 500 Hz to about 1500 Hz. In some non-limiting examples, the operational frequency may be about 500 Hz, about 600 Hz, about 700 Hz, about 800 Hz, about 900 Hz, about 1000 Hz, about 1100 Hz, about 1200 Hz, about 1300 Hz, about 1400 Hz, about 1500 Hz, or any value or range of values therebetween including endpoints. In this frequency range, the present technology includes rather large piezo-ceramic rings, spheres, and tonpilz transducers, or heavy flextensional and flexural transducers equipped with a pressure gas compensation system. The heavy piezo-ceramic transducers in this frequency range are impractical for a small AUV, and pressure-compensated systems are not reliable and are depth limited. An alternative solution may be to use underwater transducers with free flooded resonators. They can be reasonably small and the resonator can use light carbon fiber composite material. These transducers are not very broadband, but they are very efficient, which is important for autonomous battery powered systems. A problem with these transducers, and specifically for free flooded resonators, is their sensitivity to the surrounding enclosure. Working as part of a small vehicle, the underwater sound source should be designed as part of the entire AUV system. The vehicle, including the sound source, should remain streamlined thereby not increasing its drag coefficient.

Further disclosed herein are two aspects of transducers that are incorporated into the nose of a small AUV or marine glider. These two designs may be based on free flooded resonators. The proposed sound sources may be used at a depth up to about 1000 m, have longitudinal dimensions less than about 1 ft. to about 1.5 ft, (about 30.5 cm to about 45.7 cm), weigh less than about 10 kg, have very high efficiency and reasonable frequency bandwidth, easily tuned to any frequency in a range between about 500 Hz to about 1500 Hz, and have minimal impact on the vehicle drag coefficient. The small and light mid- and low-frequency sound source may be included in an AUV as a compact part of its overall design, using some of AUV components as part of the resonator.

Dipole Resonant Pipe

FIG. 1 depicts a first aspect of a sound source for use with an AUV. In this aspect, the AUV 100 includes an essentially cylindrical body 110 having a front body portion 112 and a rear body portion 114. The front body portion 112 may have a front end-cap 115*a*, and the rear body portion 114 may have a rear end-cap 115*b*. In some aspects, the AUV may include multiple horizontal wings 120 and a vertical tail fin 125 associated with the rear body portion 114. The multiple horizontal wings 120 may be used to control a depth of the AUV during forward motion, and the vertical tail fin 125 may stabilize the AUV against roll or yaw.

The AUV 100 may incorporate additional components that may form a sound source 150. The sound source 150 may include a cylindrical piezo-ceramic ring transducer 155 disposed between the front body portion 112 and the rear body portion 114. In some aspects, a rear edge of the cylindrical piezo-ceramic ring transducer 155 may be in physical contact with a front edge of the rear body portion 114 and a front edge of the cylindrical piezo-ceramic ring transducer 155 may be in physical contact with a rear edge of the front body portion 112. The ring transducer 155 must be strong enough to withstand the static water pressure at the operation depth. The ceramic ring transducer 155 may be isolated from water by a sleeve 160 that may cover an entire outer surface of the ceramic ring transducer 155. In some aspects, the sleeve 160 may extend beyond a length of the ceramic ring transducer 155 and also cover a portion of an outer surface of the front body portion 112 and a portion of an outer surface of the rear body portion 114. The sleeve 160 may be made of any thin, flexible material that is water-tight and capable of transmitting the radial vibrations of the ceramic ring transducer 155 to the water environment. In one aspect, the sleeve 160 may be made of neoprene rubber or polyether-based thermoplastic polyurethane (TPU). In another aspect, the sleeve 160 may be made of a thin, flexible metal tubing.

The sound source 150 may also include a short resonant pipe 165 mounted to the body 110 of AUV with a plurality of standoffs, such as 170*a,b*. The resonant pipe 165 may have a longitudinal pipe axis that is coaxial with a longitudinal axis of the body 110. The resonant pipe 165 may be mounted about the body 110 to produce a gap 175 between an inner surface of the resonant pipe 165 and an outer surface of the body 110. The resonant pipe 165 may be disposed so that a forward section of the resonant pipe 165 surrounds a portion of the front body portion 112. The resonant pipe 165 may be disposed so that a rear section of the resonant pipe 165 surrounds a portion of the rear body portion 114. The resonant pipe 165 may further be disposed so that a medial section of the resonant pipe 165 surrounds the ring transducer 155 and sleeve 160. In some non-limiting aspects, one or more standoffs (such as 170*a*) may be attached to an inner surface of the forward section of the resonant pipe 165 and an outer surface of the front body portion 112. In some non-limiting aspects, one or more standoffs (such as 170*b*) may be attached to an inner surface of the rear section of the resonant pipe 165 and an outer surface of the rear body portion 114.

The gap 175 between the body 110 and resonant pipe 165 may be freely flooded with water thereby forming an acoustical pipe resonator. In some aspects, the gap 175 may be about 1 inch (2.5 cm) to about 3 inches (7.5 cm) wide. An AC electrical potential may be applied across the radial dimension of the ring transducer 155. For example, one or more first electrodes may be place on an inner surface of the ring transducer 155, and one or more second electrodes may be place on an outer surface of the ring transducer 155 (the one or more second electrodes being covered by the sleeve 160). Upon the application of the AC electrical potential, the piezo-ceramic ring transducer 155 may vibrate in the radial direction. These vibrations may create water pressure oscillations within the interior of the resonant pipe 165. The oscillating pressure may accelerate the flow of water within the resonant pipe 165, thereby causing an oscillating particle velocity at a forward and at a rearward end of the gap 175. The gap 175 radiates sound through these open ends in a manner similar to a dipole pipe. In some aspects, the resonant pipe 165 may be fabricated from any stiff material such as aluminum or a light carbon-fiber composite material. In some examples, the carbon fiber composite may be a preferred material because it is stiffer and lighter than aluminum.

It may be recognized that the body 110 and the resonant pipe 165 together may form a resonant structure for water oscillating at an appropriate frequency generated by the ring transducer 155. The length of the resonant pipe 165 may be chosen to tune to any particular frequency within the about 500 Hz to about 1500 Hz range. The radiation pattern of the sound source 150 has a minimum along the longitudinal axis of the AUV 100 and maximum in a plane perpendicular to the longitudinal axis. The radiation pattern may create a gain in the maximum of the radiation pattern. The ability of the sound source 150 to amplify pressure waves in this direction can be considered as an advantage of this sound source. The water can move freely through the resonant gap 175 along the external surface of the body 110 and therefore the sound source 150 will not appreciably change the initial drag coefficient of the AUV 100.

Figure 2:
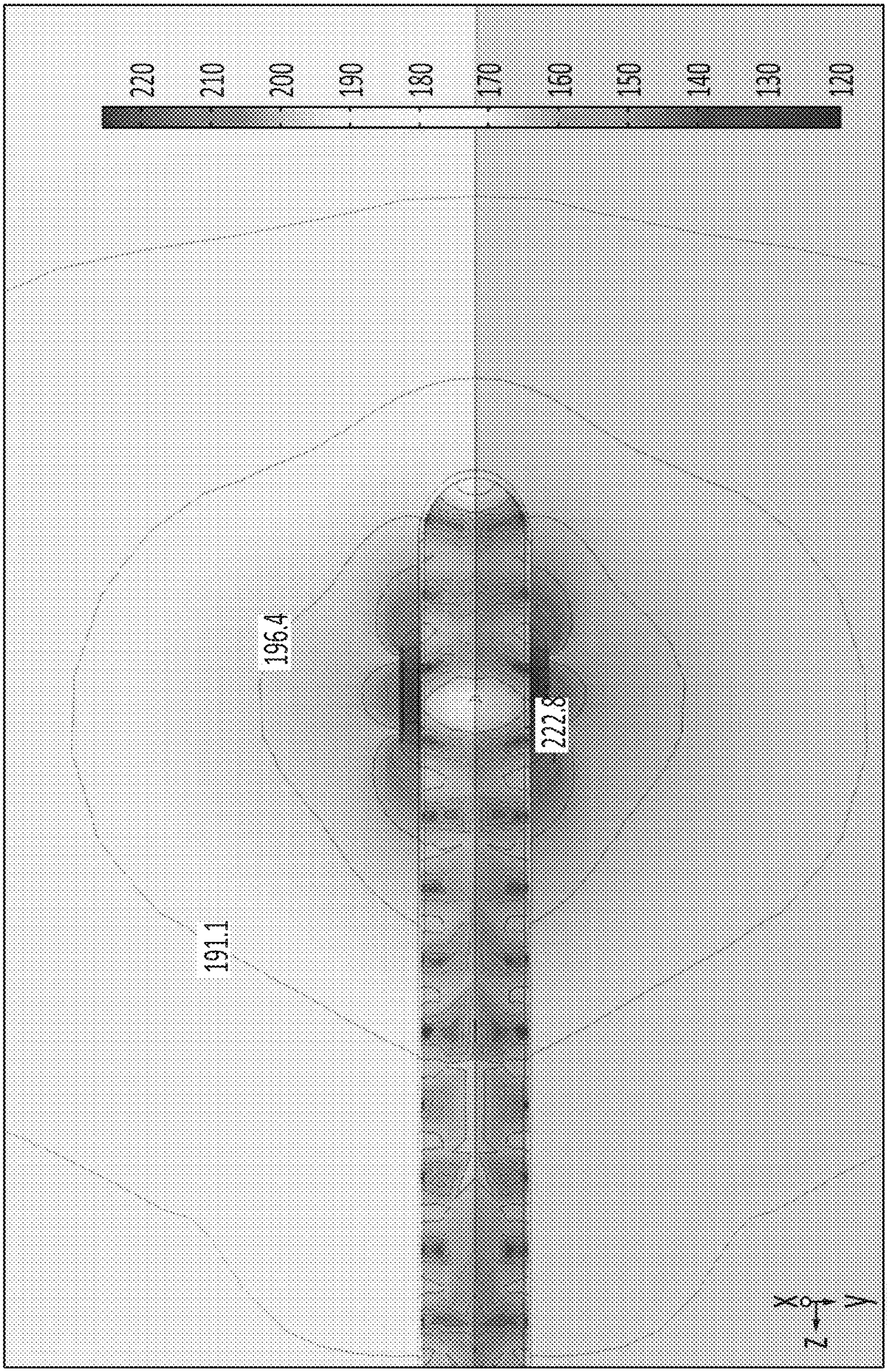
FIG. 2 is a simulation of the sound pressure level spatial distribution of the autonomous underwater vehicle depicted in FIG. 1, according to an aspect of the present disclosure.

The operation of the sound source 150 depicted in FIG. 1 has been simulated by a computer using finite-element analysis. The analysis takes into account pressure acoustics, solid state acoustics, acoustic-structural boundary interface, piezo-acoustics, and the perfect matched layer (PML) with radiation conditions within a 3 m sphere surrounding the sound source. FIG. 2 depicts an illustration of the results of such a simulation of the operation of the sound source 150 incorporated in AUV 100. In particular, FIG. 2 illustrates the spatial distribution of the sound pressure level around the AUV 100. The following parameters were used in the simulation:

Parameters of the Piezo-Ceramic Transducer Ring:
Material: PZT-4;
Transducer ring thickness: 0.5 inch (1.3 cm);
Transducer ring inside diameter: 8 inches (20.3 cm);
Transducer ring length: 3.9 inches (10 cm);
RMS voltage of the transducer ring driving signal: −500 V.

The piezo-ceramic transducer ring was operated at 1472 Hz for the simulation depicted in FIG. 2.

Parameters of the Resonant Pipe:
Material: aluminum 6061 T6;
Length: 6 inches (15.2 cm);
Inside diameter: 11.5 inches (29.2 cm);
Wall thickness: 0.25 inches (0.6 cm);
Gap between the resonant pipe and AUV cylinder: 1.25 inches (3.2 cm).

Parameters of the AUV Body (Modeled as a Gas-Filled Cylinder):
Material: aluminum 6061 T6;
Inside diameter: 8 inches (20.3 cm);
Wall thickness: 0.5 inch (1.3 cm);
Front body portion length: 7.9 inch (20 cm);
Rear body portion length: 61.0 inch (155 cm).

The endcaps of the cylinder were modeled as hemispheres of the same material and thickness as the body of the AUV. The physical parameters of the model are close to those of a typical shallow water glider.

It may be observed that the sound source creates a radial sound pressure distribution orthogonal to the longitudinal axis of the body of the AUV and centered approximately at a plane midway across the sound source. Multiple pressure nodes are also found in the air-space within the interior of the AUV body, although such pressure nodes are not required for the sound radiation by the sound source.

Figure 3:
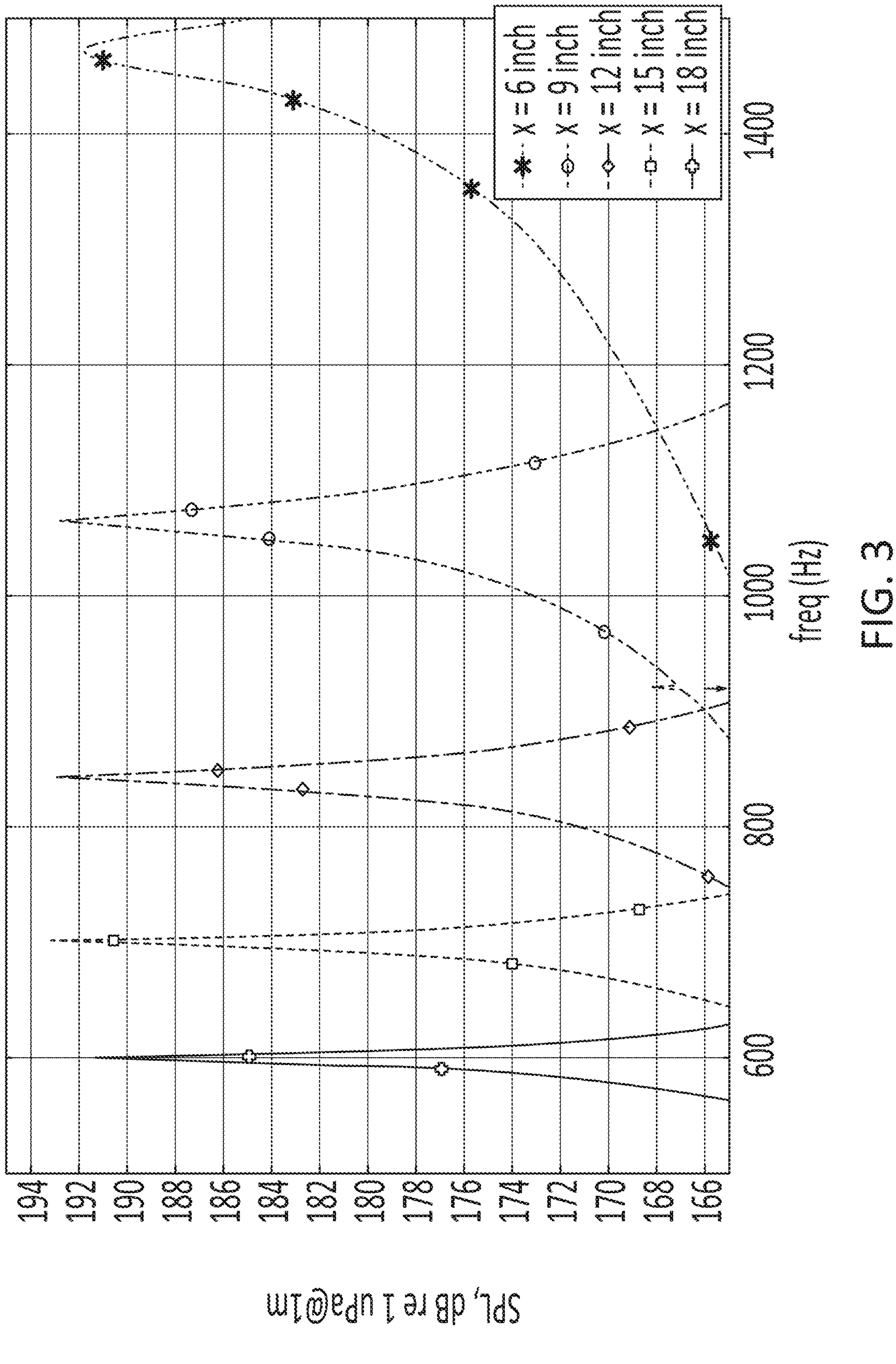
FIG. 3 is a simulation of the frequency dependence of a sound pressure level at varying resonant pipe lengths of the autonomous underwater vehicle depicted in FIG. 1, according to an aspect of the present disclosure.

FIG. 3 is a graph of the frequency dependence of the sound pressure level (SPL) for the AUV depicted in FIG. 1 and modeled according to the parameters of FIG. 2. The values were simulated at a location about 39.4 inches (1 m) from the outer surface of the piezoelectric transducer ring and along an axis at the center of the transducer ring and orthogonal to the longitudinal axis of the AUV body. In the graph in FIG. 3, the frequency dependence of the SPL is plotted for a variety of resonant pipes having lengths of 6 inches (15.2 cm), 9 inches (22.9 cm), 12 inches (30.5 cm), 15 inches (38.1 cm), and 18 inches 45.7 (cm). The range in frequencies modeled ranged from 500 Hz to 1500 Hz. It may be observed in FIG. 3 that the maximum relative pressure level generally is not dependent on the pipe length, although the maximum resonant frequency decreases with pipe length. Thus, the maximum resonant frequency is about 1472 Hz for the 6 in. pipe, about 1066 Hz for the 9 in. pipe, about 844 Hz for the 12 in. pipe, about 700 Hz for the 15 in. pipe, and about 600 Hz for the 18 in. pipe. It may be further observed that the width of the pressure curve increases (broadens) as the pipe length decreases, although the broadening becomes less symmetric about the curve maximum as the frequency increases.

Figure 4:
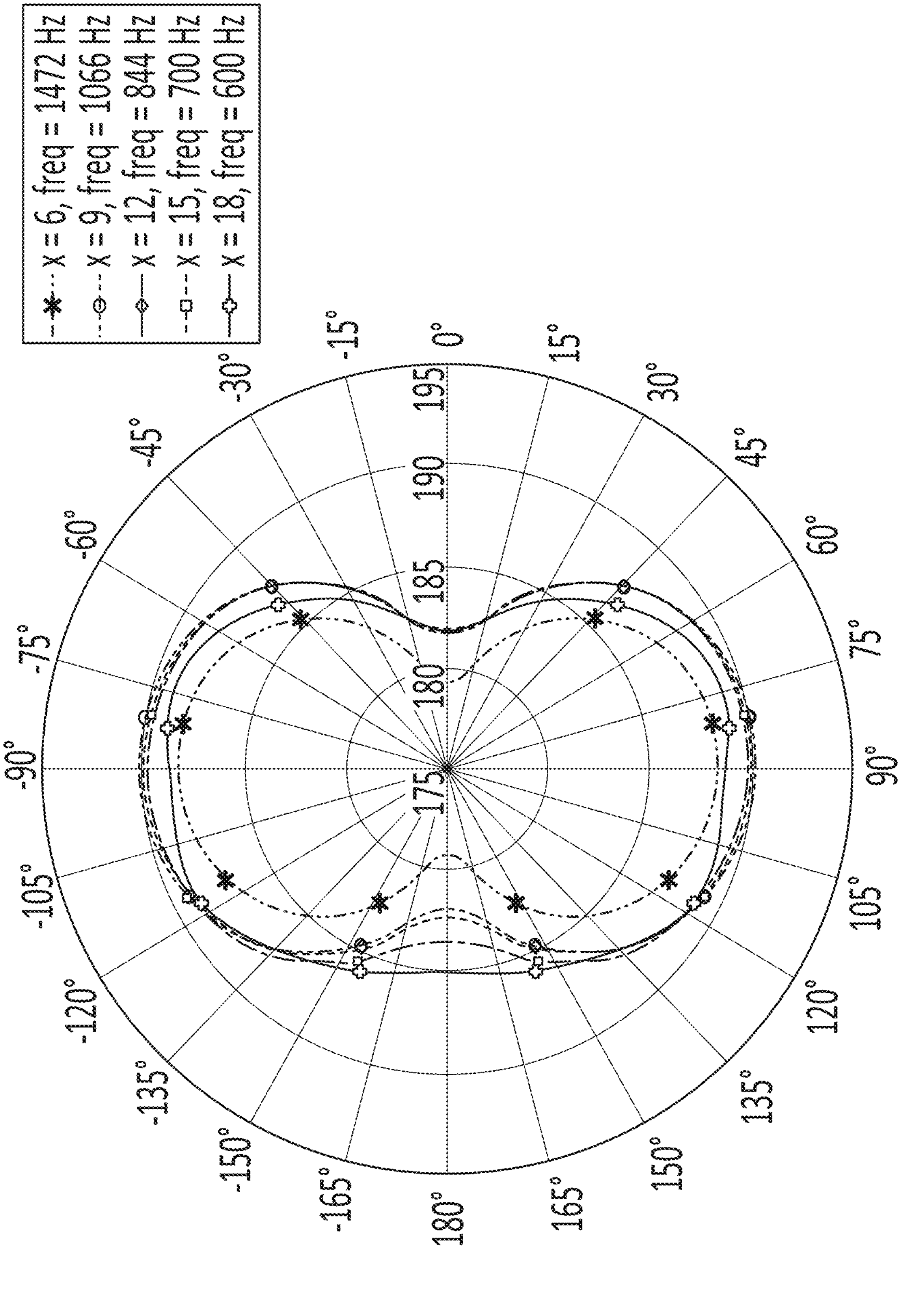
FIG. 4 is a simulation of a radiation pattern of resonant pipes of the autonomous underwater vehicle depicted in FIG. 1, according to an aspect of the present disclosure.

FIG. 4 is a graph of the radial radiation pattern (SPL) of resonant pipes with the different lengths (6 in., 9 in., 12 in, 15 in., and 18 in.) at their respective resonance frequencies (as disclosed above). The source has a directional gain in the plane perpendicular to the AUV longitudinal axis, with a maximum located along an axis perpendicular to the AUV longitudinal axis and centered about the length of the piezoelectric transducer. This axis may be defined by the diameter line in FIG. 4 traversing from −90° to +90°. It may be noticed that the transmission lobes are generally symmetric about both the dipole axis (−90° to +90°) and the longitudinal axis (0° to 180°) of the AUV at the highest frequency (1472 Hz, in FIG. 4). At lower frequencies (for example, 600 Hz, in FIG. 4), the transmission lobes become less symmetric about the dipole axis. Without being bound by theory, one can hypothesize that the lower frequency transmission is more affected by the difference in length of the front and rear body portions than the higher frequency transmission.

Omnidirectional Monopole Pipe

Figure 5:
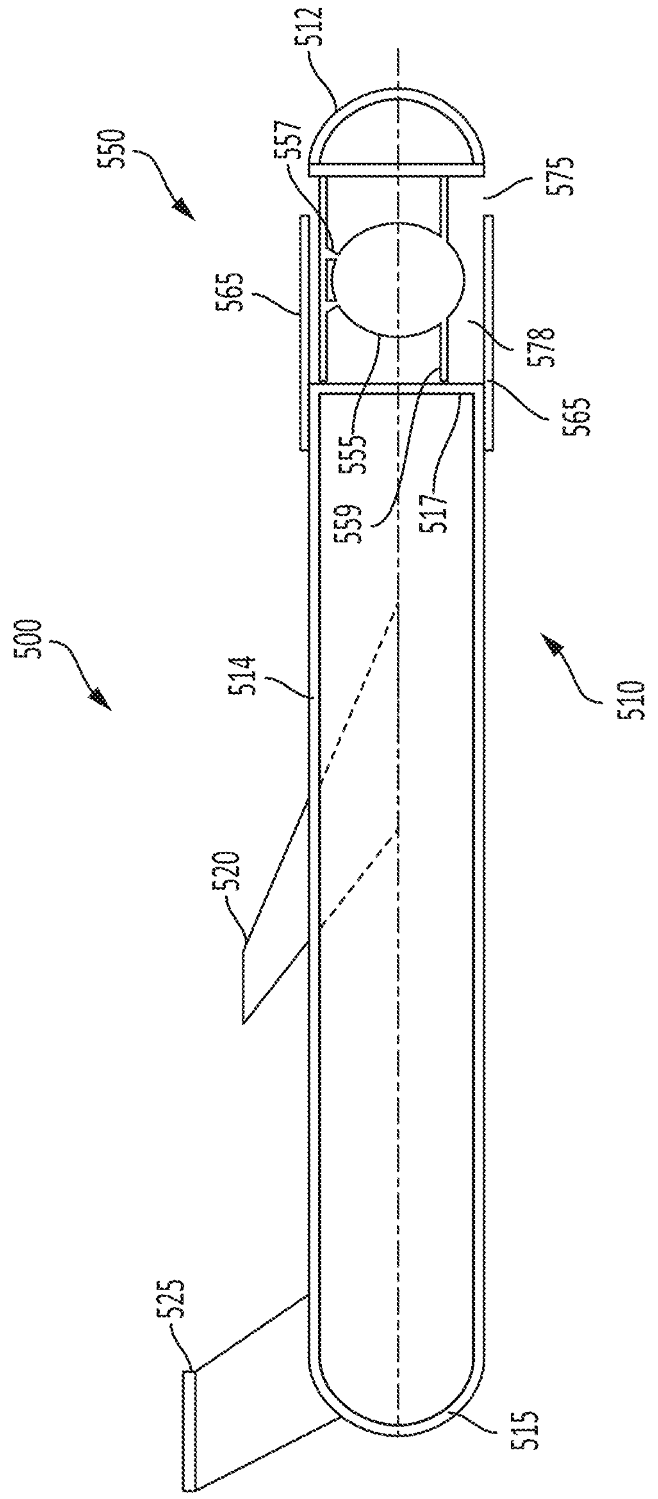
FIG. 5 depicts a diagram of a second aspect of an autonomous underwater vehicle, according to an aspect of the present disclosure.

FIG. 5 depicts a second aspect of a sound source for use with an AUV. In this aspect, the AUV 500 includes an essentially cylindrical body 510 having a front fairing 512 and a rear body portion 514. The front fairing 512 may be composed of a front endcap, and the rear body portion 514 may have a rear end-cap 515. In some aspects, the AUV may include multiple horizontal wings 520 and a vertical tail fin 525 associated with the rear body portion 514. The multiple horizontal wings 520 may be used to control a depth of the AUV during forward motion, and the vertical tail fin 525 may stabilize the AUV against roll or yaw.

The AUV 500 may incorporate additional components that may form a sound source 550. The sound source 550 may include a spherical piezo-ceramic transducer 555 disposed between the front fairing 512 and the rear body portion 514. The spherical piezo-ceramic transducer 555 must be strong enough to withhold the static water pressure at the operation depth. For example, an approximately 6 inch (15.2 cm) spherical piezo-ceramic transducer fabricated from PZT-4 piezo-ceramic having a thickness of about 0.25 inch (0.6 cm) can withstand pressures found at 1.0 km water depth. The spherical piezo-ceramic transducer 555 may be held in place by shock mounts 557 attached to a plurality of metal rods 559 that may connect a front end of the rear body portion 514 with a rear end of the front fairing 512. In some non-limiting cases, the plurality of metal rods 559 may include three metal rods.

The sound source 550 may also include a short resonant pipe 565 mounted at the front end of the rear body portion 514 and extending in a forward direction therefrom. The resonant pipe 565 may have a longitudinal pipe axis that is coaxial with a longitudinal axis of the body 510. The resonant pipe 565 may be mounted at front end of the rear body portion 514 and protrude some distance beyond a sealed front end 517 of the rear body portion 514. The plurality of metal rods 559 may dispose the front fairing 512 at a distance away from the front end of the resonant pipe 565, thereby forming a cylindrical orifice 575 between the front end of the resonant pipe 565 and the rear end of the front fairing 512. As depicted in FIG. 5, the spherical piezo-ceramic transducer 555 mounted on the plurality of metal rods 559 may be disposed within a cavity 578 defined by an interior volume of the resonant pipe 565, and the rear end of the front fairing 512. The cavity 578 may be in fluid communication with the water external to the body of the AUV 500 via the cylindrical orifice 575. Upon electrical activation of the spherical piezo-ceramic transducer 555, the water in the cavity 578 may radiate sound through the cylindrical orifice 575 thereby forming an acoustical monopole with an omnidirectional radiation pattern. In some aspects, the resonant pipe 565 may be fabricated from any stiff material such as aluminum or a light carbon-fiber composite material. In some examples, the carbon fiber composite may be a preferred material because it is stiffer and lighter than aluminum.

The cavity 578 may be freely flooded with water thereby forming an acoustical pipe resonator. In some aspects, a length of the cylindrical orifice 575 (the distance from the font end of the body 510 to the rear end of the front fairing 512) may be about 0.5 inch (1.3 cm) to about 6 inches (15.2 cm). Non-limiting examples of the cylindrical orifice 512 length may be about 0.5 inch (1.3 cm), about 1.5 inch (3.8 cm), about 2.5 inch (6.4 cm), about 3.5 inch (8.6 cm), about 4.5 inch (11.4 cm), about 5.5 inch (14.0 cm), about 6.0 inch (15.2 cm), or any value or range of values therebetween including endpoints. An AC electrical potential may be applied across the spherical piezo-ceramic transducer 555. Upon the application of the AC electrical potential, the spherical piezo-ceramic transducer 555 may vibrate in the radial direction. These vibrations may create water pressure oscillations within the interior of the cavity 578. The oscillating pressure may accelerate the flow of water within the cavity 578, thereby causing an oscillating particle velocity through the cylindrical orifice 575. The cylindrical orifice 575 may radiate sound in a manner similar to a monopole sound source.

It may be recognized that he resonant pipe 565, the sealed front end 517 of the rear body portion 514 and the rear end of the front fairing 512 together may form a resonant structure for water oscillating at an appropriate frequency generated by the spherical piezo-ceramic transducer 555. The length of the cylindrical orifice 575 may be chosen to tune to any particular frequency within the about 500 Hz to about 1500 Hz range. The radiation pattern of the sound source 550 may be similar to the directivity of an omnidirectional monopole and may have a small maximum along the longitudinal axis of the AUV 500. The ability of the sound source 550 to radiate pressure waves in all directions can be considered as an advantage of this sound source, when the direction of the receiver is unknown. The sound source 550 may not appreciably change the initial drag coefficient of the AUV 500.

Figure 6:
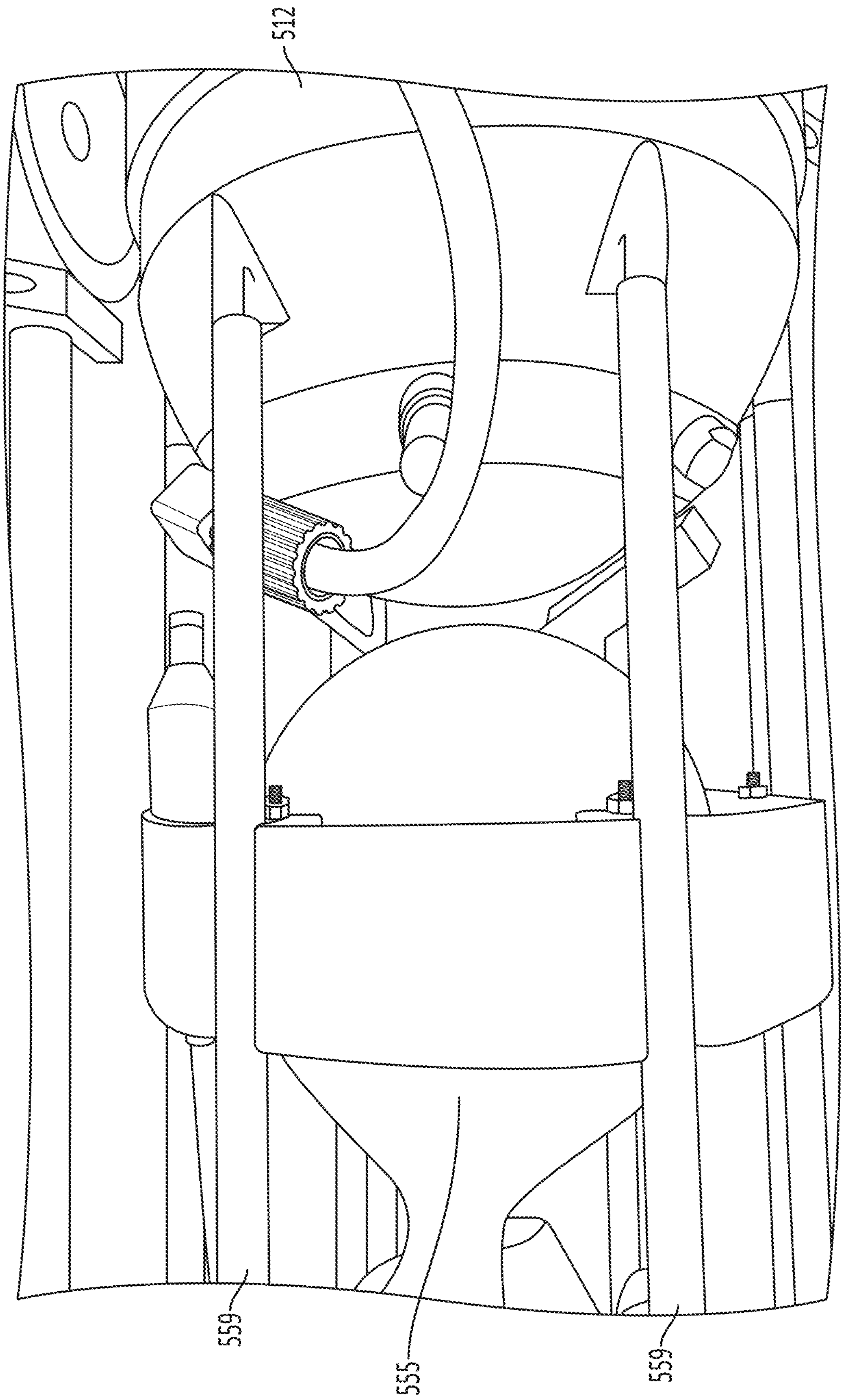
FIG. 6 depicts a close-up view of the mounted spherical piezo-ceramic transducer of the autonomous underwater vehicle depicted in FIG. 5, according to an aspect of the present disclosure.

FIG. 6 is a close-up picture of the spherical piezo-ceramic transducer 555 mounted within the plurality of held in place by shock mounts (not visible) and attached to a plurality of metal rods 559 that may connect the front end of the rear body portion (not shown) with a rear end of the front fairing 512.

Figure 7:
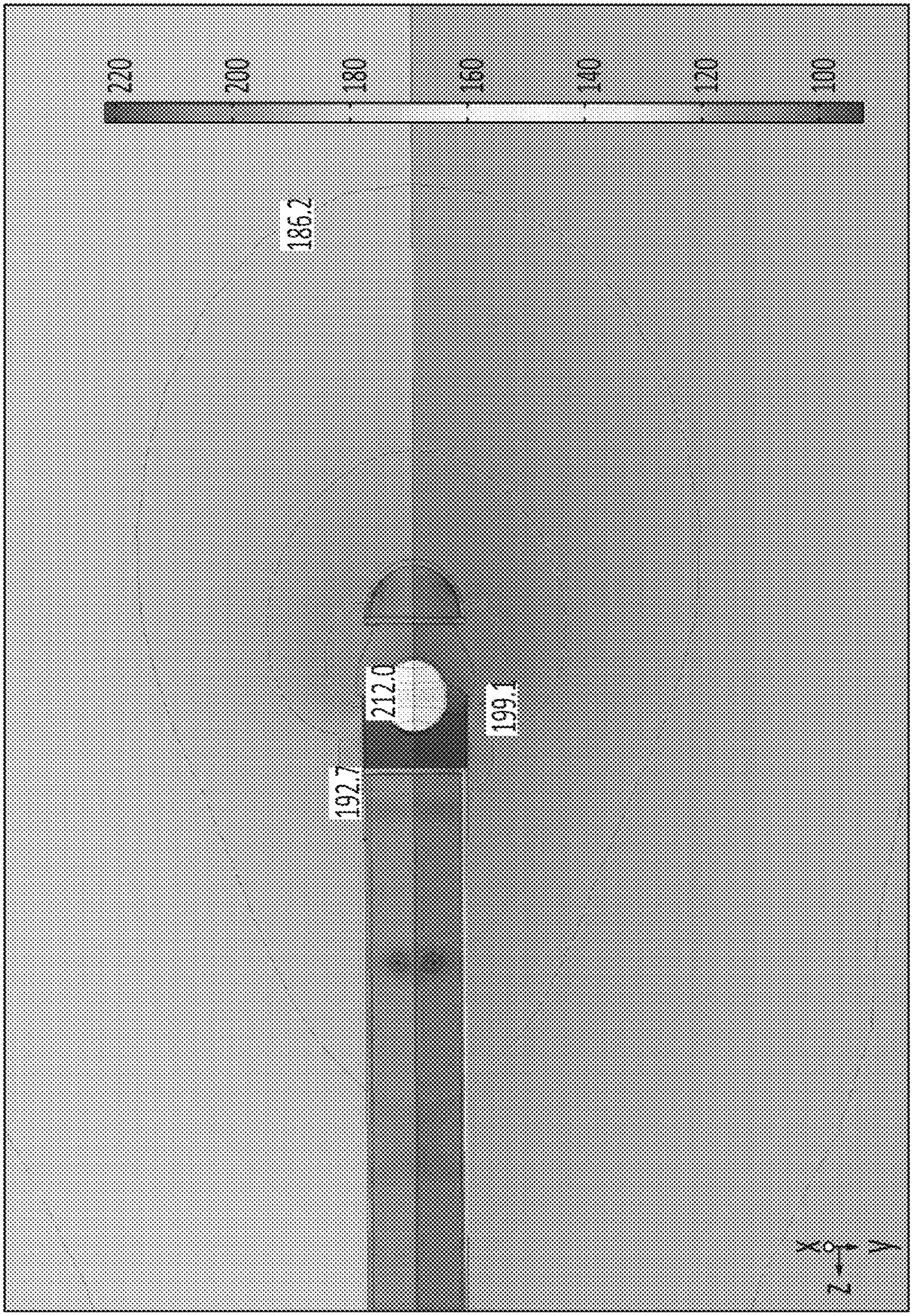
FIG. 7 is a simulation of the sound pressure level spatial distribution of the autonomous underwater vehicle depicted in FIG. 5, according to an aspect of the present disclosure.

The operation of the sound source 550 depicted in FIG. 5 has been simulated by a computer using finite-element analysis. The analysis takes into account pressure acoustics, solid state acoustics, acoustic-structural boundary interface, piezo-acoustics, and the perfect matched layer (PML) with radiation conditions within a 3 m sphere surrounding the sound source. FIG. 7 depicts an illustration of the results of such a simulation of the operation of the sound source 550 incorporated in AUV 500. In particular, FIG. 7 illustrates the spatial distribution of the sound pressure level around the AUV 500. The following parameters were used in the simulation:

Parameters of the Piezo-Ceramic Transducer Sphere:
Material: PZT-4;
Transducer sphere thickness: 0.25 inch (6 cm);
Transducer sphere diameter: 6 inches (15.2 cm);
RMS voltage of the transducer sphere driving signal: –500 V.

The piezo-ceramic transducer sphere was operated at 1242 Hz for the simulation depicted in FIG. 7.

Parameters of the Resonant Pipe:
Material: aluminum 6061 T6;
Inside diameter: 9 inches (22.9 cm);
Wall thickness: 0.25 inches (0.6 cm);
Length of cylindrical orifice between the resonant pipe and fairing: 5.5 inches (14.0 cm).

Parameters of the AUV Body (the Rear Body Portion Modeled as an Air-Filled Cylinder):
Material: aluminum 6061 T6;
Inside diameter: 8 inches (20.3 cm);
Wall thickness: 0.5 inch (1.3 cm).

The endcaps (rear endcap and front fairing) of the cylinder were modeled as hemispheres of the same material and thickness as the body of the AUV.

It may be observed that the sound source creates a sound pressure distribution radiating along the longitudinal axis of the body of the AUV and centered approximately along the longitudinal axis of the AUV.

Figure 8:
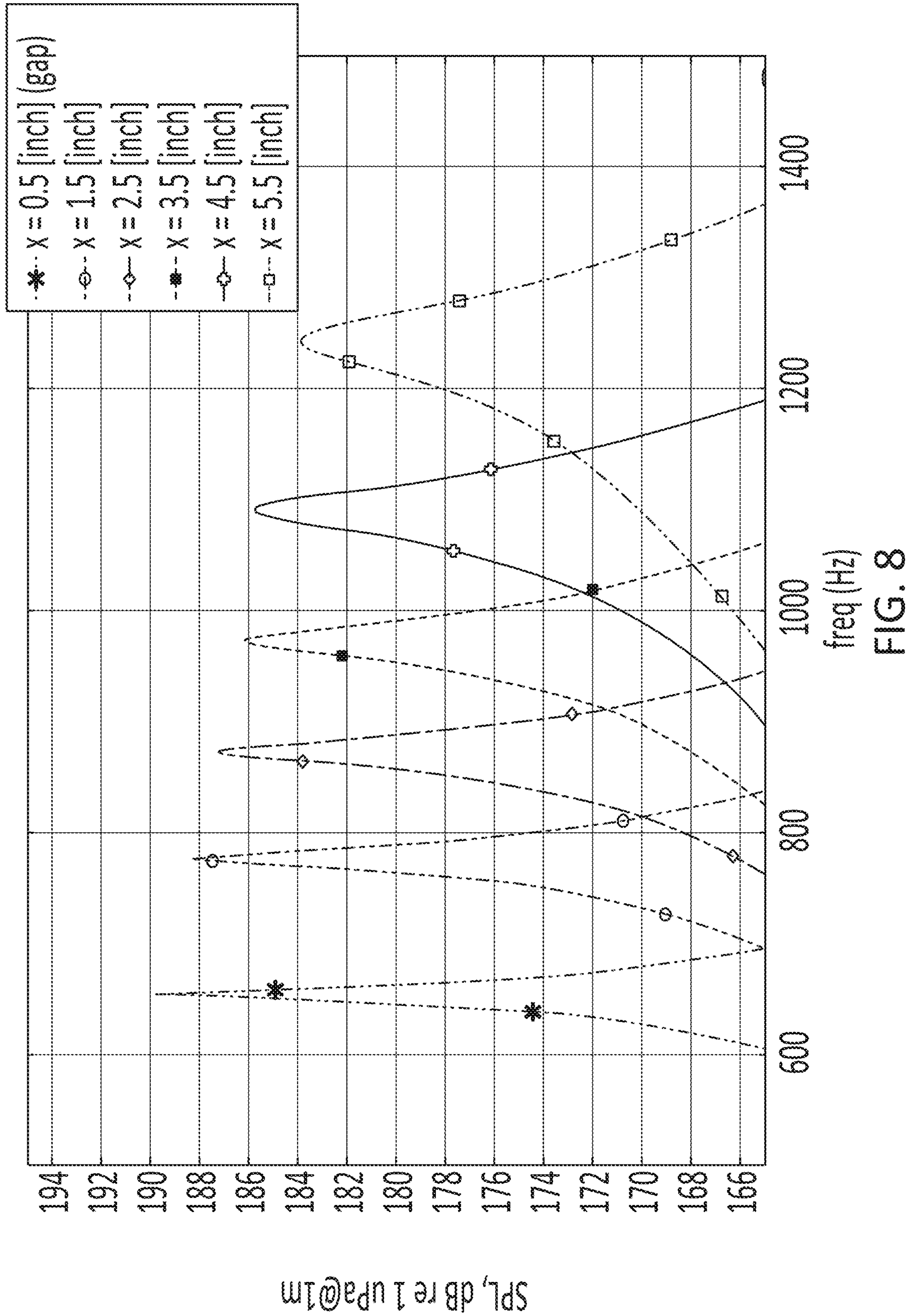
FIG. 8 is a simulation of the frequency dependence of a sound pressure level at varying resonant pipe lengths of the autonomous underwater vehicle depicted in FIG. 5, according to an aspect of the present disclosure.

FIG. 8 is a graph of the frequency dependence of sound pressure level (SPL) for the AUV depicted in FIG. 5 and modeled according to the parameters of FIG. 4. In the graph in FIG. 8, the frequency dependence of the SPL is plotted for a variety of cylindrical orifices having lengths of 0.5 inches (1.3 cm), 1.5 inches (3.8 cm), 2.5 inches (6.4 cm), 3.5 inches (8.9 cm), 4.5 inches (11.4 cm), and 5.5 inches (14.0 cm). The range in frequencies modeled ranged from 600 Hz to 1400 Hz. It may be observed in FIG. 8 that the maximum relative pressure level generally decreases as the cylindrical orifice length increases, and the maximum resonant frequency also increases with cylindrical orifice length. Thus, the maximum resonant frequency is about 654 Hz for the 0.5 in. cylindrical orifice, about 774 Hz for the 1.5 in. cylindrical orifice, about 872 Hz for the 2.5 in. cylindrical orifice, about 972 Hz for the 3.5 in. cylindrical orifice, about 1090 Hz for the 4.5 in. cylindrical orifice, and about 1242 Hz for the 5.5 in. cylindrical orifice. It may be further observed that the width of the pressure curve increases (broadens) as the cylindrical orifice length increases.

Figure 9:
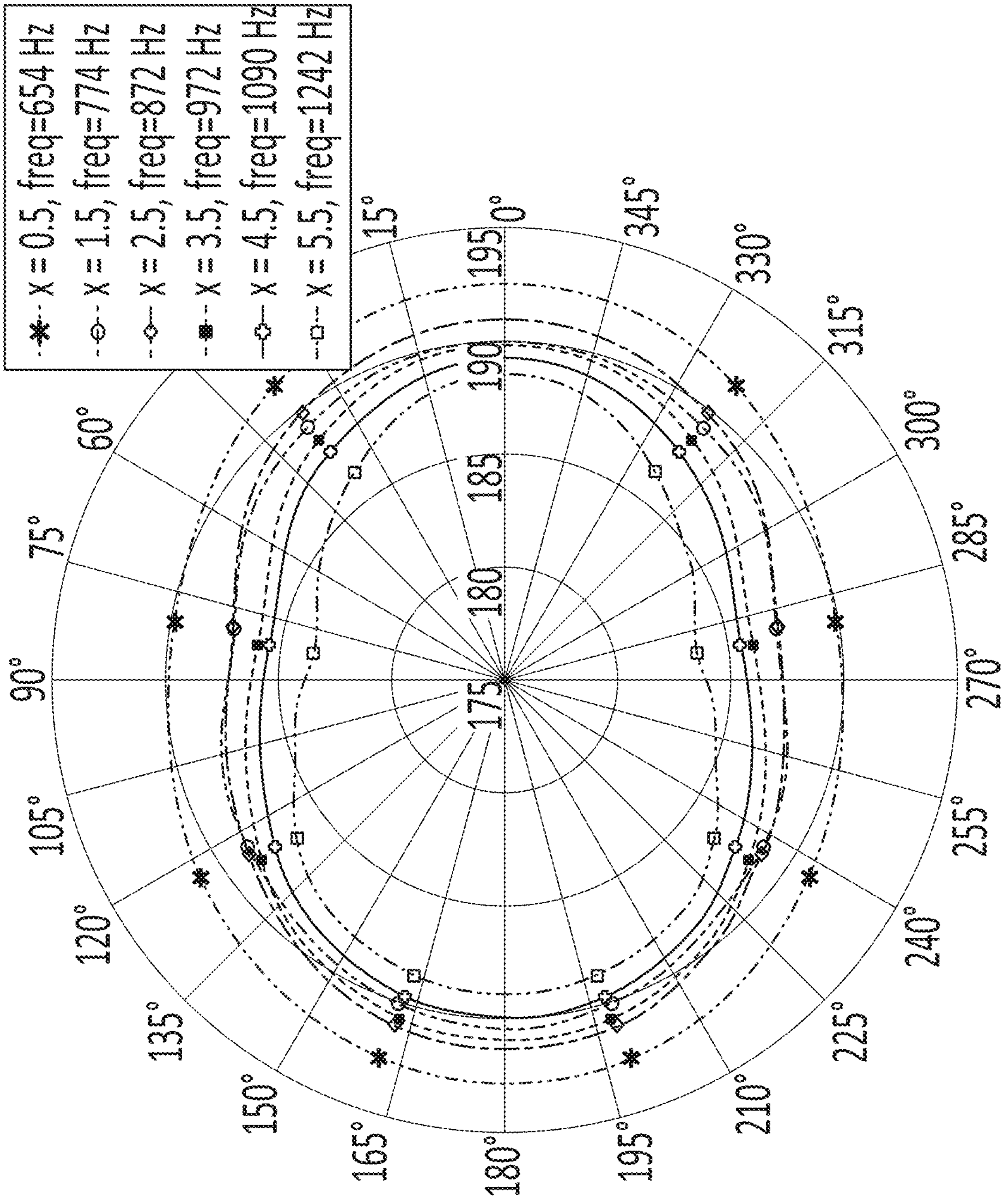
FIG. 9 is a simulation of a radiation pattern of resonant pipes of the autonomous underwater vehicle depicted in FIG. 5, according to an aspect of the present disclosure.

FIG. 9 is a graph of the radial radiation pattern (SPL) of resonant pipes having different cylindrical orifice lengths (0.5 in., 1.5 in., 2.5 in, 3.5 in., 4.5 in., and 5.5 in.) at their respective resonance frequencies (as disclosed above). The source has a directional gain along the longitudinal axis of the AUV. It may be observed that the shape of the radiation pattern becomes more ovoid as the cylindrical orifice length (and thus resonant frequency) increases.

Reference throughout the specification to "various embodiments," "some embodiments," "one embodiment," "an embodiment", "one aspect," "an aspect" or the like, means that a particular feature, structure, or characteristic described in connection with the embodiment is included in at least one embodiment. Thus, appearances of the phrases "in various embodiments," "in some embodiments," "in one embodiment", or "in an embodiment", or the like, in places throughout the specification are not necessarily all referring to the same embodiment. Furthermore, the particular features, structures or characteristics may be combined in any suitable manner in one or more aspects. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation. Such modifications and variations are intended to be included within the scope of the present invention.

While various details have been set forth in the foregoing description, it will be appreciated that the various aspects of the present disclosure may be practiced without these specific details. For example, for conciseness and clarity selected aspects have been shown in block diagram form rather than in detail. Some portions of the detailed descriptions provided herein may be presented in terms of instructions that operate on data that is stored in a computer memory. Such descriptions and representations are used by those skilled in the art to describe and convey the substance of their work to others skilled in the art.

Unless specifically stated otherwise as apparent from the foregoing discussion, it is appreciated that, throughout the foregoing description, discussions using terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

All of the above-mentioned U.S. patents, U.S. patent application publications, U.S. patent applications, foreign patents, foreign patent applications, non-patent publications referred to in this specification and/or listed in any Application Data Sheet, or any other disclosure material are incorporated herein by reference, to the extent not inconsistent herewith. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

Some aspects may be described using the expression "coupled" and "connected" along with their derivatives. It should be understood that these terms are not intended as synonyms for each other. For example, some aspects may be described using the term "connected" to indicate that two or more elements are in direct physical or electrical contact with each other. In another example, some aspects may be described using the term "coupled" to indicate that two or more elements are in direct physical or electrical contact. The term "coupled," however, also may mean that two or more elements are not in direct contact with each other, but yet still co-operate or interact with each other.

In some instances, one or more components may be referred to herein as "configured to," "configurable to," "operable/operative to," "adapted/adaptable," "able to," "conformable/conformed to," etc. Those skilled in the art will recognize that "configured to" can generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

Although various embodiments have been described herein, many modifications, variations, substitutions, changes, and equivalents to those embodiments may be implemented and will occur to those skilled in the art. Also, where materials are disclosed for certain components, other materials may be used. It is therefore to be understood that the foregoing description and the appended claims are intended to cover all such modifications and variations as falling within the scope of the disclosed embodiments. The following claims are intended to cover all such modification and variations.

In summary, numerous benefits have been described which result from employing the concepts described herein. The foregoing description of the one or more embodiments has been presented for purposes of illustration and description. It is not intended to be exhaustive or limiting to the precise form disclosed. Modifications or variations are possible in light of the above teachings. The one or more embodiments were chosen and described in order to illustrate principles and practical application to thereby enable one of ordinary skill in the art to utilize the various embodiments and with various modifications as are suited to the particular use contemplated. It is intended that the claims submitted herewith define the overall scope.

What is claimed is:

1. An underwater sound source comprising:
- a cylindrical body comprising a front body portion and a rear body portion;
- a cylindrical piezo-ceramic ring transducer disposed between the front body portion and the rear body portion;
- a flexible sleeve configured to cover an outer surface of the cylindrical piezo-ceramic ring transducer; and
- a resonant pipe mounted to the cylindrical body and surrounding the cylindrical piezoceramic ring transducer,
- wherein the resonant pipe is disposed around the cylindrical piezo-ceramic ring transducer forming a gap between an inner surface of the resonant pipe and the outer surface of the cylindrical piezo-ceramic ring transducer.

2. The underwater sound source of claim 1, wherein a rear edge of the cylindrical piezo-ceramic ring transducer is in physical contact with a front edge of the rear body portion and a front edge of the cylindrical piezo-ceramic ring transducer is in physical contact with a rear edge of the front body portion.

3. The underwater sound source of claim 1, further comprising:
- a front end-cap affixed to a front end of the front body portion; and
- a rear end-cap affixed to a rear end of the rear body portion.

4. The underwater sound source of claim 3 wherein an inner volume of the cylindrical body and an inner volume of the piezo-ceramic ring transducer are filled with a gas.

5. The underwater sound source of claim 1, further comprising a plurality of standoffs, wherein each of the plurality of standoffs has a first end in mechanical communication with a portion of the inner surface of the resonant pipe and a second end in mechanical communication with a portion of the outer surface of the cylindrical body.

6. The underwater sound source of claim 5, wherein at least one of the plurality of standoffs has a second end in mechanical communication with a portion of an outer surface of the rear body portion of the cylindrical body, and at least one of the plurality of standoffs has a second end in mechanical communication with a portion of an outer surface of the front body portion of the cylindrical body.

7. The underwater sound source of claim 1, wherein the sleeve is further configured to cover a portion of a surface of the rear body portion and a portion of a surface of the front body portion.

8. The underwater sound source of claim 1, wherein the cylindrical body is fabricated from aluminum.

9. The underwater sound source of claim 1, wherein the cylindrical body is fabricated from a light carbon fiber composite material.

10. The underwater sound source of claim 1, wherein the resonant pipe is fabricated from a light carbon fiber composite material.

11. The underwater sound source of claim 1, wherein a first section of the resonant pipe is further disposed around a forward portion of the front body portion of the cylindrical body, and wherein a second section of the resonant pipe is further disposed around a rearward portion of the rear body portion of the cylindrical body.

12. The underwater sound source of claim 1, wherein the cylindrical piezo-ceramic ring is configured to resonate at a frequency of 500 Hz to 1500 Hz.

13. The underwater sound source of claim 12, wherein the cylindrical body and the resonant pipe together form a resonant structure at the resonating frequency of the cylindrical piezoceramic ring.

* * * * *